US008253123B2

(12) United States Patent
Jonkers et al.

(10) Patent No.: US 8,253,123 B2
(45) Date of Patent: Aug. 28, 2012

(54) METHOD AND DEVICE FOR GENERATING EUV RADIATION OR SOFT X-RAYS WITH ENHANCED EFFICIENCY

(75) Inventors: Jeroen Jonkers, Aachen (DE); Felix A. Kuepper, Viersen (DE); Harald E. Verbraak, Maastricht (NL); Jakob W. Neff, Kelmis (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/139,601

(22) PCT Filed: Dec. 9, 2009

(86) PCT No.: PCT/IB2009/055598

§ 371 (c)(1), (2), (4) Date: Jun. 14, 2011

(87) PCT Pub. No.: WO2010/070540

PCT Pub. Date: Jun. 24, 2010

(65) Prior Publication Data

US 2011/0248192 A1 Oct. 13, 2011

(30) Foreign Application Priority Data

Dec. 16, 2008 (EP) .................................... 08171838

(51) Int. Cl.

| | |
|---|---|
| ***G01N 21/00*** | (2006.01) |
| ***G01N 21/33*** | (2006.01) |
| ***H05G 2/00*** | (2006.01) |
| ***G01J 3/10*** | (2006.01) |

(52) U.S. Cl. ................. 250/504 R; 250/503.1; 250/365; 250/493.1; 315/111.21; 372/76; 378/119; 313/326

(58) Field of Classification Search .............. 250/504 R, 250/365, 503.1, 493.1; 315/111.21; 372/76; 378/119; 313/326

See application file for complete search history.

(56) References Cited

U.S. PATENT DOCUMENTS

| | | | | |
|---|---|---|---|---|
| 6,973,164 | B2 | 12/2005 | Hartlove et al. | |
| 7,250,621 | B2 | 7/2007 | Gaebel et al. | |
| 7,317,196 | B2 | 1/2008 | Partlo et al. | |
| 7,368,741 | B2 * | 5/2008 | Melnychuk et al. | 250/504 R |
| 7,427,766 | B2 * | 9/2008 | Jonkers et al. | 250/504 R |
| 7,897,948 | B2 * | 3/2011 | Jonkers et al. | 250/504 R |
| 8,040,033 | B2 * | 10/2011 | Zhokhavets et al. | 313/326 |

(Continued)

FOREIGN PATENT DOCUMENTS

EP 1492394 A2 12/2004

(Continued)

*Primary Examiner* — Nikita Wells

(74) *Attorney, Agent, or Firm* — Mark L. Beloborodov

(57) ABSTRACT

The present invention relates to a method and device for generating optical radiation, in particular EUV radiation or soft x-rays, by means of an electrically operated discharge. A plasma (15) is ignited in a gaseous medium between at least two electrodes (1, 2), wherein said gaseous medium is produced at least partly from a liquid material (6) which is applied to one or several surface(s) moving in the discharge space and is at least partially evaporated by one or several pulsed energy beams. In the proposed method and device at least two consecutive pulses (9, 18) are applied within a time interval of each electrical discharge onto said surface(s). With this measure, the collectable conversion efficiency is increased compared to the use of only one single energy pulse within each electrical discharge.

15 Claims, 3 Drawing Sheets

U.S. PATENT DOCUMENTS

| | | | |
|---|---|---|---|
| 2004/0022295 | A1 | 2/2004 | Weulersse et al. |
| 2006/0215712 | A1 | 9/2006 | Ziener et al. |
| 2008/0149862 | A1 | 6/2008 | Hansson et al. |
| 2008/0151205 | A1 | 6/2008 | Ivanov et al. |

FOREIGN PATENT DOCUMENTS

| | | | |
|---|---|---|---|
| EP | 1976344 | A2 | 10/2008 |
| EP | 2046100 | A1 | 4/2009 |
| WO | 2005025280 | A2 | 3/2005 |
| WO | 2005089131 | A2 | 9/2005 |
| WO | 2007121142 | A2 | 10/2007 |
| WO | 2007135587 | A2 | 11/2007 |
| WO | 2008088488 | A1 | 7/2008 |

* cited by examiner

METHOD AND DEVICE FOR GENERATING EUV RADIATION OR SOFT X-RAYS WITH ENHANCED EFFICIENCY

FIELD OF THE INVENTION

The present invention relates to a method and device for generating optical radiation, in particular EUV radiation or soft x-rays, by means of electrically operated discharges, wherein a plasma is ignited in a gaseous medium between at least two electrodes in a discharge space, said plasma emitting said radiation that is to be generated, and wherein said gaseous medium is produced at least partly from a liquid material which is applied to a one or several surface(s) moving in said discharge space and is at least partially evaporated by one or several pulsed energy beams. Such discharge based light sources when emitting EUV radiation or soft x-rays, in particular in the wavelength range between approximately 1 and 20 nm, are mainly required in the field of EUV lithography and metrology.

BACKGROUND OF THE INVENTION

In light sources of the above kind the radiation is emitted from hot plasma produced by a pulsed current. Very powerful EUV radiation generating devices are operated with metal vapor to generate the required plasma. An example of such a device is shown in WO2005/025280 A2. In this known EUV radiation generating device the metal vapor is produced from a metal melt which is applied to a surface in the discharge space and at least partially evaporated by a pulsed energy beam, in particular a laser beam. In a preferred embodiment of this device the two electrodes are rotatably mounted forming electrode wheels which are rotated during operation of the device. The electrode wheels dip during rotation into containers with the metal melt. A pulsed laser beam is directed directly to the surface of one of the electrodes in order to generate the metal vapor from the applied metal melt. This metal vapor cloud expands towards the second electrode and leads to a short circuit between the two electrodes which are connected to a charged capacitor bank, thus igniting the electrical discharge. Due to the low inductance of the electrical circuit, an electrical pulse with a few tens of kA is created that heats the plasma to several tens of eV within around 100 ns. Through this heating the desired ionization stages are exited and radiation in the EUV region is emitted from a pinch plasma. The conversion efficiency is defined as the ratio of EUV radiation, i.e. a 2% bandwidth centered on 13.5 nm, emitted in 2π sr and the energy initially stored at the capacitor bank.

For application of this EUV radiation in a EUV scanner not only the amount of EUV radiation produced per pulse is of interest, but also the fraction that can be used by the scanner. This holds only for the radiation originating from a sphere with around 1 mm diameter. The exact diameter depends on the solid angle of the collector optics and the étendue of the scanner. Especially for discharge produced plasmas, like the above of the so called “Aachener Lampe”, it is known that not all of the produced EUV radiation is centered within the above collectable volume. This is mainly due to the large region between the center of the plasma and one of the electrodes from which region EUV is emitted as well. In spite of the low intensity, the total amount of energy emitted from this region is still significant due to its large volume. The collectable conversion efficiency (CCE) is the ratio of collectable EUV radiation and the electrical pulse energy, and is therefore the metric for the overall efficiency of the EUV generation.

SUMMARY OF THE INVENTION

It is an object of the present invention to provide a method and device for generating optical radiation, in particular EUV radiation or soft x-rays, by means of an electrically operated discharge with enhanced collectable conversion efficiency.

The object is achieved with the device and method according to claims 1 and 9. Advantageous embodiments of the method and device are subject of the dependent claims and are furthermore described in the following portions of the description.

In the proposed method a plasma is ignited in a gaseous medium between at least two electrodes in a discharge space, said plasma emitting the radiation that is to be generated. The gaseous medium is produced at least partly from a liquid material, in particular a metal melt, which is applied to one or several surface(s) moving in the discharge space and is at least partially evaporated by one or several pulsed energy beams, which may be, for example, ion or electron beams and in a preferred embodiment are laser beams. The pulses of the pulsed energy beam(s) are generated such that within a time interval of each electrical discharge at least two consecutive pulses of the pulsed energy beam(s) are directed onto the surface(s) evaporating the applied liquid material.

The corresponding device comprises at least two electrodes arranged in a discharge space at a distance from one another which allows ignition of a plasma in a gaseous medium between the electrodes, a device for applying a liquid material to one or several surface(s) moving in said discharge space and an energy beam device adapted to direct one or several pulsed energy beams onto said surface(s) evaporating said applied liquid material at least partially and thereby producing at least part of said gaseous medium. The energy beam device is designed to apply within a time interval of each electrical discharge at least two consecutive pulses of the pulsed energy beam(s) onto said surface(s). The proposed device may otherwise be constructed like the device described in WO2005/025280 A2, which is incorporated herein by reference.

A main aspect of the proposed method and device is to apply not only one single energy beam pulse for each electrode discharge, but to apply at least two consecutive pulses within the time interval of each electrical discharge or current pulse. The time interval starts with the application of the first energy beam pulse initiating the corresponding electrical discharge and ends when the capacitor bank is discharged after the corresponding current pulse. Due to the evaporation of liquid material by two or more consecutive pulses during each electrical discharge the spatial distribution of the plasma and thus of the generated radiation is much more concentrated in the volume than is the case when using only one single energy beam pulse per discharge. This results in an increase of collectable conversion efficiency such that much more of the generated radiation can be used by a scanner. Another advantage of the more concentrated radiation emission is that the high intensity region is situated closer to the middle of the collection volume than is the case with one single pulse, which also improves the optical performance of a scanner in which the radiation is used.

In an advantageous embodiment of the method and device the at least two consecutive pulses are applied with a mutual time delay of $\leqq$300 ns. With such a short time distance a significant increase in the collectable conversion efficiencies is achieved compared to the use of only one single pulse. The at least two consecutive pulses can be generated by using two separate energy beam sources, in particular laser sources, each having their own trigger in order to achieve the appropriate timing. It is also possible to use only one single energy beam source, the pulsed energy beam of which is split up into two or more partial beams. The delays between the single pulses are then achieved by different delay lines for the different partial beams. Appropriate beam splitters, in particular for laser beams, for splitting up one beam into several partial beams are known in the art.

Dependent on the application several parameters may be optimized in order to get maximum collectable conversion efficiency for the corresponding application. These parameters are the time delay between the consecutive pulses, the polarization of the consecutive pulses, the wavelengths of the consecutive pulses, the spatial and temporal intensity distribution of the consecutive pulses on the moving surface(s) as well as the angle of incidence of these pulses on the moving surface(s). This also means, that each of the two or more consecutive pulses by have another polarization, wavelength, spatial and temporal intensity distribution on the moving surface(s) and angle of incidence on the moving surface(s). The spatial intensity distribution may be controlled by a separate optics for each individual laser beam. The optimization may be performed with one or all or any possible combination of the above parameters.

In an advantageous embodiment at least one of the above parameters is controlled based on appropriate measurements with a diagnostics unit. These measurements may include the EUV yield in the collectable volume and may also include a measurement of the amount of fast ions emitted by the plasma. When measuring the EUV yield with appropriate radiation detectors, like for example back lighted CCD cameras or photodiodes, the parameters are advantageously optimized to get the maximum EUV yield in the collectable volume. When measuring the output of fast ions, the parameters may be controlled to achieve the lowest output of fast ions that may sputter the collector. The corresponding device in the above cases comprises a control unit which controls at least one of the above parameters based on the measurement results.

For measuring the output of fast ions, a small pick-up coil can be located in the vicinity of the capacitor bank or of the electrode system. This coil produces a voltage that is proportional to the time-derivative of the current as both are proportional to the magnetic field. That is why this pick-up coil is also called dI/dt probe. From the dependency of the dI/dt signal on time, the pinch dynamics can be derived which on its hand gives information whether the production of fast ions is successfully suppressed or not. Fast ions with kinetic energies above 10 keV are harmful as they can be hardly stopped by the debris mitigation system, so that they sputter away the optical coating of the collector mirror. In order to achieve a collector life-time of at least a year, successfully reducing the production of fast ions is necessary. This may be obtained with the above described control unit.

The at least two consecutive pulses may be applied to the same lateral location of the moving surface(s) with respect to the moving direction of this surface(s), in particular the moving electrode surface(s). In an advantageous embodiment, the consecutive pulses are applied at different lateral locations with respect to this moving direction. This allows a better usage of the liquid material applied to the surface(s) and may also be used to achieve a better spatial distribution of the generated plasma. In this context the term lateral means a direction on the surface perpendicular to the moving direction of the surface. With this technique the discharge volume can be expanded in directions in which this volume normally has a small extension. Since the spatial fluctuations of the discharge cloud or volume do not change compared to the application of only a single pulse, the relative fluctuations of the discharge volume are smaller with such a technique. Furthermore, by distributing the impact points of the energy beam pulses on the moving surface appropriately, the light emission volume, which is the discharge volume, can be formed in the right way in order to optimally adapt the light emission volume to the acceptance area of an optical system, for example the optical system of a lithography scanner, thus allowing a more effective use of the generated radiation.

In addition to or instead of varying the lateral position of consecutive pulses within each discharge, the pulse groups of at least two different electrical discharges, preferably of consecutive electrical discharges—each pulse group being formed of the consecutive pulses of the corresponding electrical discharge—may be applied to the different lateral positions.

In an advantageous embodiment the energy beam pulses, either the consecutive pulses within each discharge or the pulse groups of different electrical discharges, are applied to the moving surface(s) such that a periodically repeating pattern of impact points is achieved on the moving surface(s). This pattern results as a combination of the movement of the corresponding surface, the time intervals between the pulses and the lateral distribution of the pulses. For example, the pattern may be selected to approximate a circular distribution of impact points or may be selected to comprise three impact points resulting from three pulses or pulse groups, each of these impact points forming a corner of an isosceles triangle.

The above proposed diagnostics and control unit may also be used to control the lateral positions of the pulses or pulse groups such that a desired geometry of the emission volume or of the EUV intensity within the collectable volume is achieved.

BRIEF DESCRIPTION OF THE DRAWINGS

The proposed method and device are described in the following in connection with the accompanying drawings without limiting the scope of the claims. The figures show:

DETAILED DESCRIPTION OF EMBODIMENTS

Figure 1:
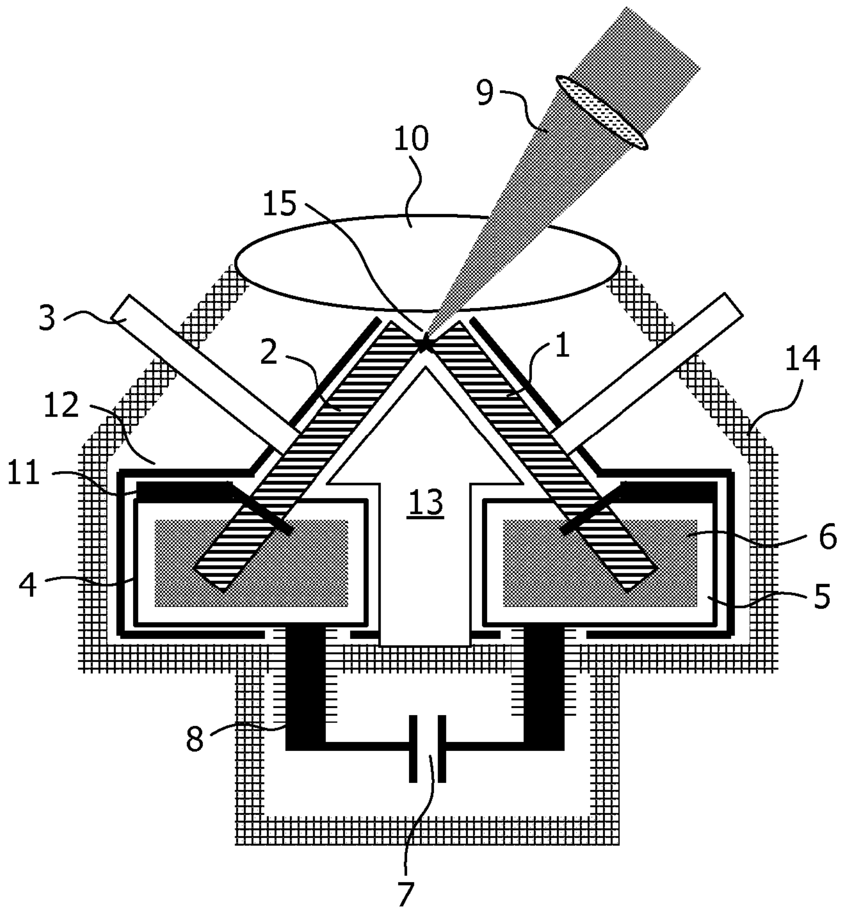
FIG. 1 a schematic view of a device for generating EUV radiation or soft x-rays.

FIG. 1 shows a schematic side view of a device for generating EUV radiation or soft x-rays to which the present method can be applied and which may be part of the device of the present invention. The device comprises two electrodes 1, 2 arranged in a vacuum chamber. The disc shaped electrodes 1, 2 are rotatably mounted, i.e. they are rotated during operation about rotational axis 3. During rotation the electrodes 1, 2 partially dip into corresponding containers 4, 5. Each of these containers 4, 5 contains a metal melt 6, in the present case liquid tin. The metal melt 6 is kept on a temperature of approximately 300° C., i.e. slightly above the melting point of 230° C. of tin. The metal melt 6 in the containers 4, 5 is maintained at the above operation temperature by a heating device or a cooling device (not shown in the figure) connected to the containers. During rotation the surface of the electrodes 1, 2 is wetted by the liquid metal so that a liquid metal film forms on said electrodes. The layer thickness of the liquid metal on the electrodes 1, 2 can be controlled by means of strippers 11 typically in the range between 0.5 to 40 μm. The current to the electrodes 1, 2 is supplied via the metal melt 6, which is connected to the capacitor bank 7 via an insulated feed through 8.

With such a device, the surface of the electrodes is continuously regenerated so that no discharge wear of the base material of the electrodes occurs. The rotation of the electrode wheels through the metal melt results in a close heat contact between the electrodes and the metal melt such that the electrode wheels heated by the gas discharge can release their heat effectively to the melt. The low ohmic resistance between the electrode wheels and the metal melt furthermore allows conducting very high currents which are necessary to generate a sufficiently hot plasma for EUV radiation generation. A rotation of the capacitor bank delivering the current or elaborate current contacts is not required. The current can be delivered stationary via one or several feed throughs from outside of the metal melt.

The electrode wheels are advantageously arranged in a vacuum system with a basic vacuum of less than $10^{-4}$ hPa ($10^{-4}$ mbar). A high voltage can be applied to the electrodes, for example a voltage of between 2 to 10 kV, without causing any uncontrolled electrical breakdown. This electrical breakdown is started in a controlled manner by an appropriate pulse of a pulsed energy beam, in the present example a laser pulse. The laser pulse 9 is focused on one of the electrodes 1, 2 at the narrowest point between the two electrodes, as shown in the figure. As a result, part of the metal film on the electrodes 1, 2 evaporates and bridges over the electrode gap. This leads to a disruptive discharge at this point accompanied by a very high current from the capacitor bank 7. The current heats the metal vapor, also called fuel in this context, to such high temperatures that the latter is ionized and emits the desired EUV radiation in pinch plasma 15.

In order to prevent the fuel from escaping from the device, a debris mitigation unit 10 is arranged in front of the device. This debris mitigation unit 10 allows the straight pass of radiation out of the device but retains a high amount of debris particles on their way out of the device. In order to avoid the contamination of the housing 14 of the device a screen 12 may be arranged between the electrodes 1, 2 and the housing 14. An additional metal screen 13 may be arranged between the electrodes 1, 2 allowing the condensed metal to flow back into the two containers 4, 5.

Figure 3:
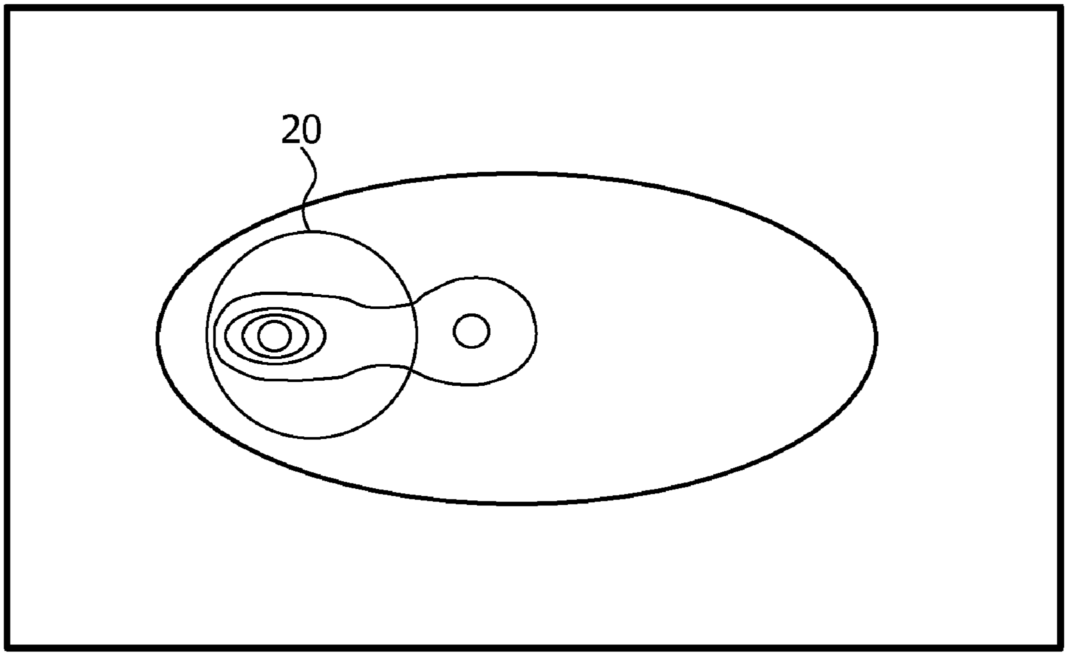
FIG. 3 a schematic image of the EUV radiation emitted by a plasma created by one single laser pulse according to the prior art.

With such a EUV generating device, when used and constructed according to the prior art, one single laser pulse is used to initiate each electrical discharge. FIG. 3 shows a schematic image of the EUV radiation emitted by a plasma created by one single laser pulse in such a device. To enhance the visibility of the low intensity emission region a logarithmic scale is taken. The different intensities are approximately indicated by the different shells drawn in this image. The outer shells show the lowest intensity wherein the innermost shell relates to the highest intensity. The closed circle denotes a typical collectable volume 20 for a EUV scanner. As can be seen from this image, outside of the collectable volume 20 also EUV radiation is emitted. In spite of the low intensity, the total amount of the energy emitted by the region outside of the collectable volume 20 is still significant due to its large volume. In the plasma depicted in FIG. 3, this means that only around half of the generated radiation can be used in a EUV scanner. The collectable conversion efficiency of this plasma equals 0.8%. This is close to the maximum that can be achieved when only one single laser pulse is used for the evaporation of tin in such a EUV generating device.

Figure 2:
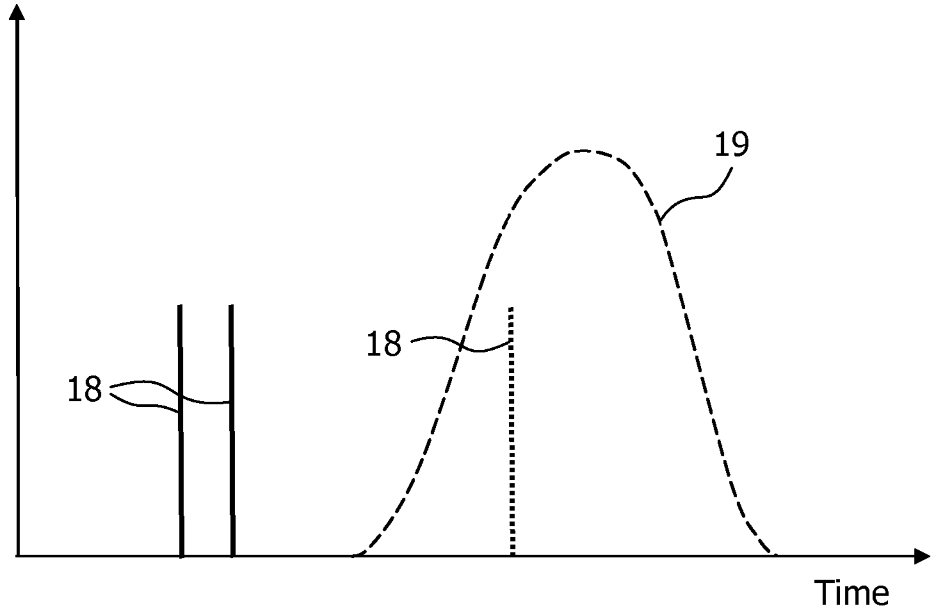
FIG. 2 a schematic diagram showing the time delay between consecutive pulses applied within the time period of one electrical discharge.
Figure 4:
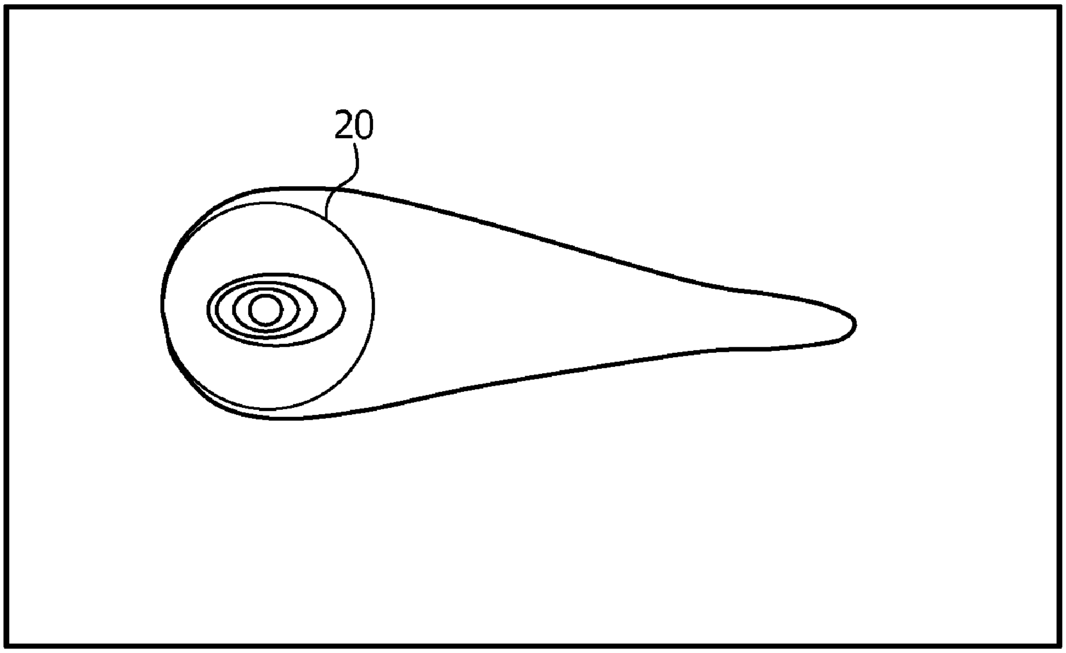
FIG. 4 a schematic image of the EUV emitted by a plasma created with two consecutive laser pulses according to the present invention.

In order to increase the collectable conversion efficiency, in the present method and device more than one laser pulse per electrical discharge is used to generate the tin cloud. FIG. 2 shows an embodiment, in which two consecutive laser pulses 18 with only 25 ns time difference are used to evaporate the tin. In this diagram, the duration of the electrical current pulse 19 is indicated with the dashed line and the two consecutive pulses 18 at the beginning of this current pulse 19 are shown. In this example, the second laser pulse is already applied before the formation of the electrical current pulse 19. The delay between the two consecutive laser pulses may also be increased such that the second laser pulse is applied during the electrical discharge (see dotted line in FIG. 2). The resulting spatial intensity distribution of the emitted EUV radiation is shown in FIG. 4 which can be directly compared with the image of FIG. 3. The total amount of EUV radiation generated is similar to that of FIG. 3, but the spatial distribution is much more concentrated in the collectable volume 20 denoted by the closed circle, which can be used by a EUV scanner. The collectable conversion efficiency of this plasma is around 1.3% which means an improvement in efficiency of more than 50% compared to the use of only one single laser pulse for each plasma discharge. It is obvious for the skilled person that the proposed method is not limited to the two consecutive laser pulses shown in FIG. 2. Also three or more consecutive laser pulses may be applied per electrical discharge in order to improve the collectable conversion efficiency.

The appropriate timing between the consecutive laser pulses may be achieved by using different lasers with each their own trigger and/or by using beam splitters and delay lines. Both measures can be applied by appropriately modifying the device according to FIG. 1.

Instead of applying the consecutive pulses within each discharge or the groups of pulses of different discharges at the same lateral position with respect to the moving electrode surface, these pulses can also be applied at different lateral locations with respect to the moving direction of the surface of the rotating electrode wheel. With such a distribution of laser pulses or laser pulse impacts on the tin surface, a plasma pinch or radiation emitting volume is formed which has averaged over one or several discharges a higher extension in the direction of the diameter compared to the prior art. With such a larger diameter or extension in radial direction the relative spatial fluctuations are reduced. The device of FIG. 1 only has to be adapted to obtain such a distribution of laser pulses on the surface of the electrode wheel. This may be achieved using several laser light sources focusing at different lateral locations on the electrode wheel or by using a rotational or scanning optics between the laser light source and the surface of the electrode wheel.

Figure 5:
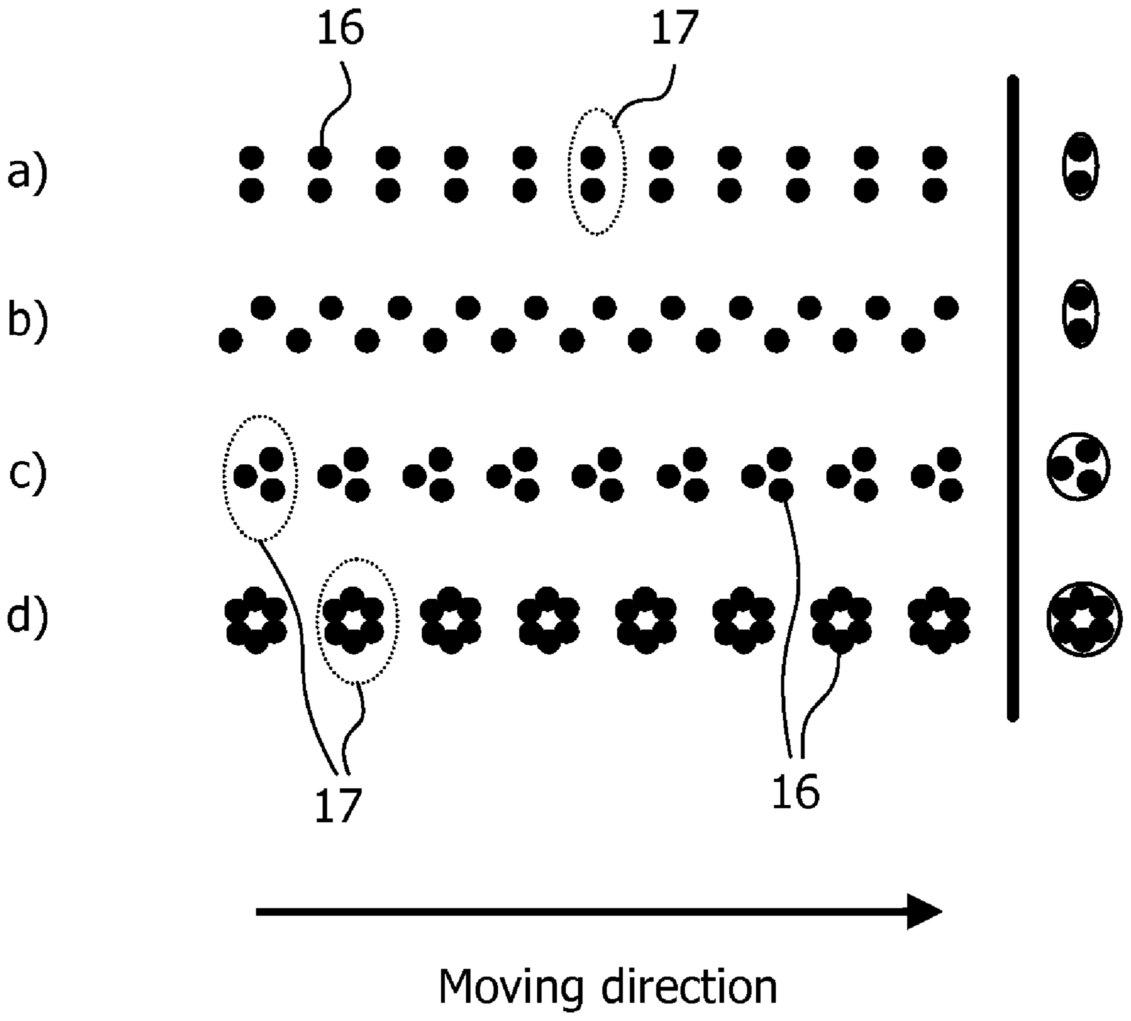
FIG. 5 a schematic view of patterns of impact points on the moving surface according to one embodiment of the present invention.

FIG. 5 shows examples of impact patterns which can be achieved with such a lateral variation of the application of the laser pulses on the moving electrode surface. Depending on the time interval between the pulses or pulse groups a pattern 17 of impact points 16 as indicated in FIGS. 5*a* and 5*b* is achieved on the surface. If the two laser pulses or laser pulse groups are applied in a very short time interval compared to the rotating speed of the electrode wheels, a pattern like in FIG. 5*a* is achieved. If all of the pulses are applied at the same time interval, a zigzag pattern as indicated in FIG. 5*b* is achieved.

Using three laser pulses or laser pulse groups for a pattern, a structure approximating an isosceles triangle may be achieved as indicated in FIG. 5*c*. Each of the impact points 16 is on the corner of the triangle. Such a pattern combines the advantage of the enhanced output power with the advantage of the larger emission region or volume of EUV radiation. This emission region is indicated with the closed circles on the right hand side in FIGS. 5*a* to 5*d*. The three laser pulses or pulse groups to this end may be applied in very short distance in time compared to the rotation speed of the electrode wheels. The next discharge is then generated after a larger time interval as can be recognized from FIG. 5*c*.

While the invention has been illustrated and described in detail in the drawings and foregoing description, such illustration and description are to be considered illustrative or exemplary and not restrictive. The invention is not limited to the disclosed embodiments. The different embodiments described above and in the claims can also be combined. Other variations to the disclosed embodiments can be understood and effected by those skilled in the art in practicing the claimed invention, from the study of the drawings, the disclosure and the appended claims. For example, the application of consecutive pulses is not limited to the application of two consecutive pulses. It is also possible to use more than two lasers or consecutive pulses in order to achieve the desired increase of the collectable conversion efficiency. The invention is also not limited to EUV radiation or soft x-rays but may be applied to any kind of optical radiation which is emitted by an electrically operated discharge.

In the claims, the word "comprising" does not exclude other elements or steps, and the indefinite article "a" or "an" does not exclude a plurality. The mere fact that measures are recited in mutually different dependent claims does not indicate that a combination of these measures cannot be used to advantage. The reference signs in the claims should not be construed as limiting the scope of these claims.

LIST OF REFERENCE SIGNS

1 electrode
2 electrode
3 rotational axis
4 container
5 container
6 metal melt
7 capacitor bank
8 feed through
9 laser pulse
10 debris mitigation unit
11 strippers
12 shield
13 metal screen
14 housing
15 pinch plasma
16 impact point
17 pattern
18 consecutive laser pulses
19 electrical current pulse
20 collectable volume

The invention claimed is:

1. A device for generating EUV radiation or soft x-rays, by means of electrically operated discharges, comprising at least two electrodes arranged in a discharge space at a distance from one another which allows ignition of a plasma in a gaseous medium between said electrodes, a device for applying a liquid material to one or several surface(s) moving through said discharge space and an energy beam device adapted to direct one or several pulsed energy beams onto said surface(s) evaporating said applied liquid material at least partially thereby producing at least part of said gaseous medium, wherein said energy beam device is designed to apply within a time interval of each electrical discharge at least two consecutive pulses of said pulsed energy beam(s) onto said surface(s).

2. The device according to claim 1, wherein said energy beam device is designed to apply said at least two consecutive pulses with a mutual time delay of 300 ns.

3. The device according to claim 1, wherein said energy beam device is designed to apply said at least two consecutive pulses of each electrical discharge and/or pulse groups of at least two different electrical discharges at different lateral locations with respect to a moving direction of said surface(s).

4. The device according to claim 3, wherein said energy beam device is designed to apply the pulses or pulse groups of said pulsed energy beam(s) to achieve a periodically repeating pattern of impact points at said surface(s) during operation of the device.

5. The device according to claim 1, wherein said device for applying a liquid material is adapted to apply the liquid material to a surface of at least one of said electrodes, said at least one of said electrodes being designed as a rotatable wheel which can be placed in rotation during operation.

6. The device according to claim 1, further comprising radiation sensors arranged for measuring a characteristic of said generated optical radiation and/or a dI/dt probe for determining an amount of fast ions generated by the discharge.

7. The device according to claim 6, further comprising a control unit connected to said energy beam device and controlling a time delay between the two consecutive pulses based on the measured characteristic and/or determined amount of fast ions.

8. The device according to claim 7, wherein the control unit is designed to control the time delay between the two consecutive pulses to achieve a maximum EUV output and/or a minimum amount of fast ions generated by the discharge.

9. A method of generating EUV radiation or soft x-rays, by means of electrically operated discharges, in which a plasma is ignited in a gaseous medium between at least two electrodes in a discharge space, said plasma emitting said radiation that is to be generated, wherein said gaseous medium is produced at least partly from a liquid material (6), which is applied to one or several surface(s) moving in said discharge space and is at least partially evaporated by one or several pulsed energy beam(s), and wherein at least two consecutive pulses of said pulsed energy beam(s) are applied within a time interval of each electrical discharge onto said surface(s).

10. The method according to claim 9, wherein said at least two consecutive pulses are applied with a mutual time delay of $\geqq$300 ns.

11. The method according to claim 9, wherein said at least two consecutive pulses of each electrical discharge and/or pulse groups of at least two different electrical discharges are applied at different lateral locations with respect to a moving direction of said surface(s).

12. The method according to claim 11, wherein the pulses or pulse groups of said pulsed energy beam(s) are applied to the surface(s) such that a periodically repeating pattern of impact points is achieved at said surface(s) during movement of said surface(s).

13. The method according to claim 9, wherein a characteristic of said generated optical radiation and/or an amount of fast ions generated by the discharge is detected and a time delay between the two consecutive pulses is controlled based on measurement data of said detection.

14. The method according to claim 13, wherein the time delay between the two consecutive pulses is controlled to achieve maximum EUV output and/or minimum amount of fast ions.

15. A method according to claim 9, wherein at least one of said electrodes is set in rotation during operation, said liquid material being applied to a surface of said at least one of said electrodes.

* * * * *